Feb. 22, 1949.     D. A. DAVIS     2,462,168
ANTICUT NONSTRIP-OUT HANDLE
Filed Jan. 31, 1945
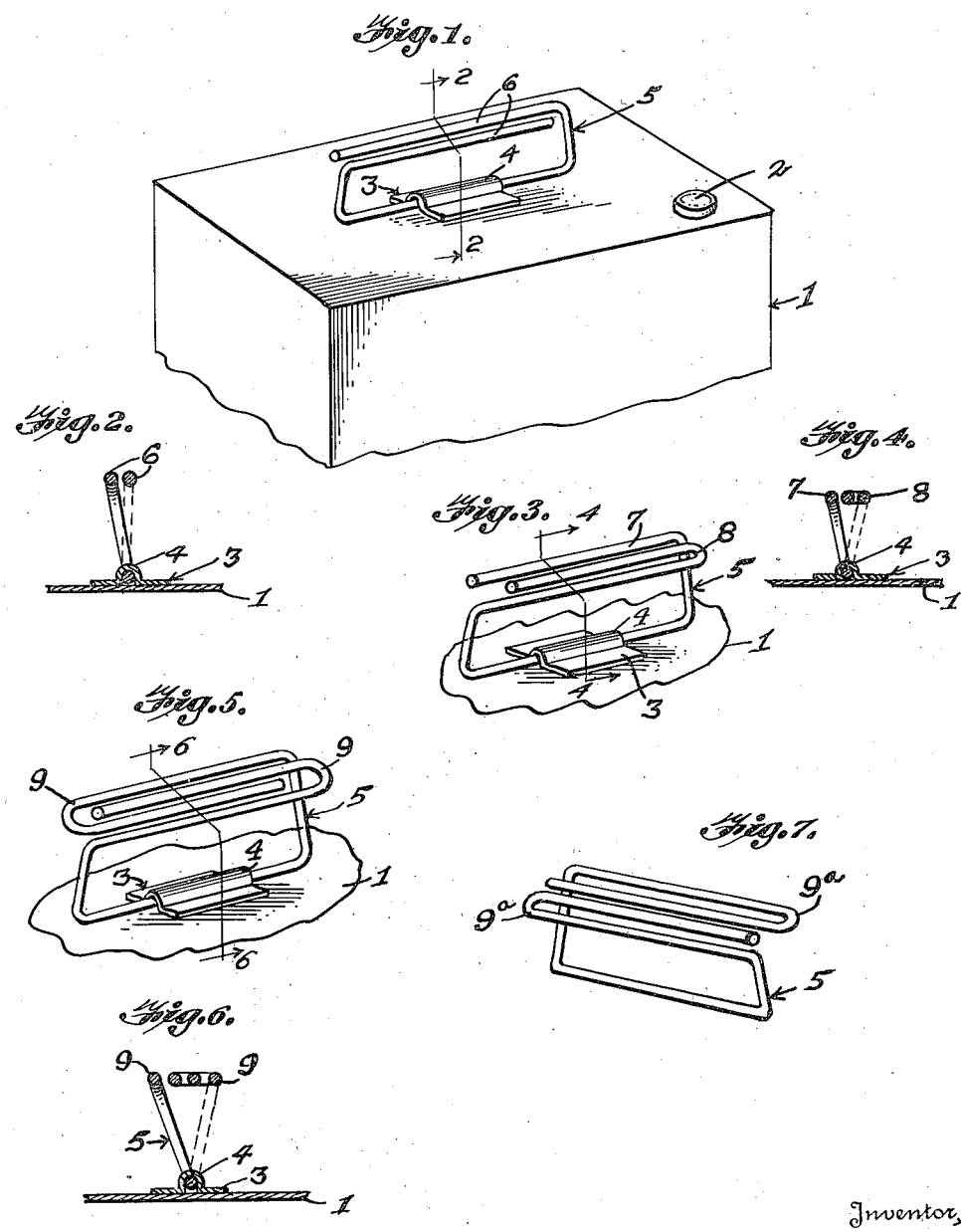
Inventor,
DELOS A. DAVIS.
By E. E. Vrooman & Co.,
His Attorneys.

Patented Feb. 22, 1949

2,462,168

UNITED STATES PATENT OFFICE 2,462,168

ANTICUT NONSTRIP-OUT HANDLE

Delos A. Davis, Detroit, Mich.

Application January 31, 1945, Serial No. 575,490

2 Claims. (Cl. 16—126)

This invention relates to an anti-cut non-strip-out handle.

An object of the invention is the provision of simple and novel means for carrying a container of any description.

Another object of the invention is the construction of a novel handle which will not tear or rip out of the attaching or fastening means on a container.

A still further object of the invention is the construction of a novel handle which can be securely fastened to a container, and which handle will provide a broad hand-engaging grip, which will be easy on the hand of the operator.

Another object of the invention is the construction of a novel handle in which a portion is passed entirely through the fastening means with the ends of the handle formed in a peculiar way, whereby an efficient grip is provided.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Fig. 1 is a perspective view of a handle constructed in accordance with the present invention, shown attached to a container.

Fig. 2 is a sectional view, taken on line 2—2, Fig. 1, and looking in the direction of the arrows.

Fig. 3 is a perspective view of another embodiment of the invention.

Fig. 4 is a sectional view, taken on line 4—4, Fig. 3, and looking in the direction of the arrows.

Fig. 5 is a perspective view of another embodiment of the present invention.

Fig. 6 is a sectional view, taken on line 6—6, Fig. 5, and looking in the direction of the arrows.

Fig. 7 is a perspective view of another embodiment of the invention.

Referring to the drawings, 1 designates a container of any description, which container is provided with the ordinary filling cap 2. On top of the container 1 is a suitable attaching or fastening means 3. This fastening means 3 is preferably shown with a raised portion 4, under which a portion of handle 5 is placed.

The handle 5 may be formed of wire of any weight, and the lower portion thereof extends entirely through the fastening means 3, whereby it is impossible for the handle to pull out of said fastening means.

The handle 5 is provided with two straight end portions 6, which are arranged in parallel position, and are formed in the same horizontal plane. By this construction, a relatively broad grip is formed, which can be easily grasped by the operator and which will not injure or hurt his hand.

In the embodiment shown in Figs. 3 and 4, the handle 5 is provided with a straight end portion 7 and a substantially U-shaped end portion 8. The portions 7 and 8 are arranged in the same horizontal plane, whereby a much broader hand-engaging grip is formed, than is the case with the handle illustrated in Fig. 1.

In the embodiment shown in Figs. 5 and 6, the handle 5 is provided with two substantially U-shaped portions 9, which portions "interlock," producing not only a broad and efficient grip, but a strong grip by reason of the interlocking of the U-shaped portions 9.

In the embodiment shown in Fig. 7, the handle 5 is provided with two susbtantially U-shaped portions 9ª; these portions 9ª do not interlock, as shown in Fig. 5, but are slightly spaced apart, which affords a very broad grip on the handle.

It is to be understood that in all of my embodiments the ends, or end portions of the handle are arranged in the same horizontal plane, whereby an efficient grip is provided for the non-strip-out handle.

In the old-style handle, the ends thereof are placed under the fastening means 3, but this structure is unsatisfactory, as it permits the ends to be drawn from under the fastening means, which is not true in my novel handle, as there are no ends to be withdrawn; in my handle, one continuous piece of material extends under the fastening means, with the ends thereof above said fastening means, forming a novel grip.

After my handle is formed, if the operator desires, he may hold the end partions of the handle permanently intact in any suitable manner, such as soldering or welding, or the like.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the class described, the combination with fastening means, of a handle provided with a portion extending through said fastening means, said handle provided with a pair of U-shaped end-portions, each end-portion provided with a free leg, and said end-portions lying in a common horizontal plane with the free leg of each lying between the legs of the other U-shaped end-portion.

2. In a device of the class described, the combination with fastening means, of a handle provided with a portion extending through said fastening means, said handle provided with a pair of end-portions, one of said end-portions being substantially U-shaped, each end-portion provided with a free leg, and said end-portions normally being spaced apart and lying in the same horizontal plane with the free leg of each end-portion being in a contiguous position.

DELOS A. DAVIS.

REFERENCES CITED

The following references are of record in the file of this patent:

UNITED STATES PATENTS

| Number | Name | Date |
|---|---|---|
| 336,699 | Coleman | Feb. 23, 1886 |
| 514,410 | Brown | Feb. 6, 1894 |
| 980,872 | Kempter | Jan. 3, 1911 |
| 1,625,038 | Love | Apr. 19, 1927 |
| 1,700,613 | Meigs | Jan. 29, 1929 |
| 1,737,249 | Kempter | Nov. 26, 1929 |